INVENTORS
TOKUJI IIJIMA, YOHJI ODAWARA,
TETSUO YAMAGUCHI & HAYAO YAHAGI

BY Craig, Antonelli & Hill
ATTORNEYS

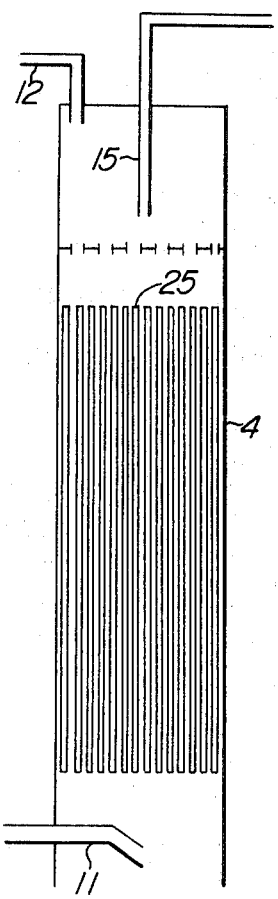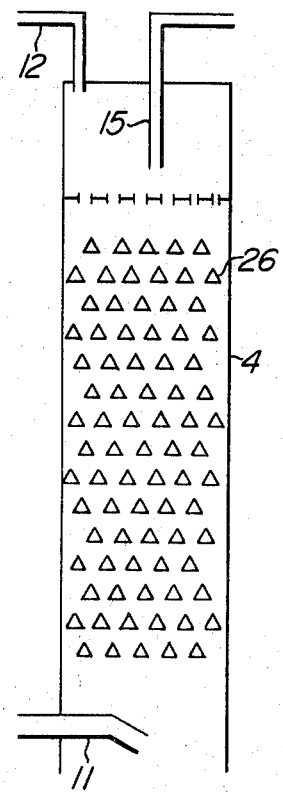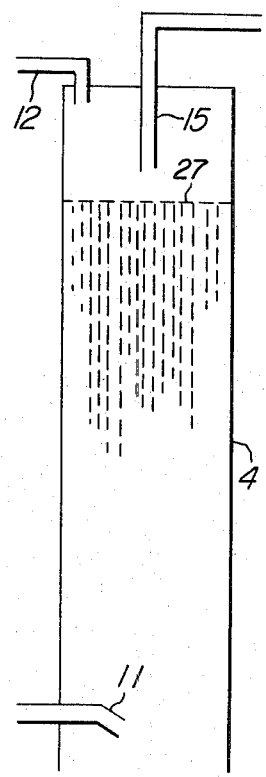

July 16, 1974  TOKUJI IIJIMA ET AL  3,824,151
APPARATUS FOR AEROBIC FERMENTATION
Filed July 7, 1971  4 Sheets-Sheet 3

INVENTORS
TOKUJI IIJIMA, YOHJI ODAWARA
TETSUO YAMAGUCHI & HAYAO YAHAGI

BY Craig, Antonelli + Hill
ATTORNEY

July 16, 1974  TOKUJI IIJIMA ET AL  3,824,151
APPARATUS FOR AEROBIC FERMENTATION
Filed July 7, 1971  4 Sheets-Sheet 4

INVENTORS
TOKUJI IIJIMA, YOHJI ODAWARA,
TETSUO YAMAGUCHI & HAYAO YAHAGI

BY Craig, Antonelli & Hill
ATTORNEYS

United States Patent Office 3,824,151
Patented July 16, 1974

3,824,151
APPARATUS FOR AEROBIC FERMENTATION
Tokuji Iijima, Yohji Odawara, Tetsuo Yamaguchi, and Hayao Yahagi, Hitachi, Japan, assignors to Hitachi, Ltd., Tokyo, Japan
Filed July 7, 1971, Ser. No. 160,304
Claims priority, application Japan, July 13, 1970, 45/60,636; Mar. 19, 1971, 46/15,135
Int. Cl. C12b 1/14
U.S. Cl. 195—142                                14 Claims

ABSTRACT OF THE DISCLOSURE

Supply of oxygen to microorganisms and removal of the heat of fermentation in the fermentation of aerobic microorganisms are carried out by gas-liquid contact of a culture medium dispersed in a droplet state or film state with the air, whereby the oxygen can be dissolved into the culture medium and at the same time the heat of fermentation can be removed as a sensible heat and latent heat. Cooling water for removing the heat of fermentation can be also saved thereby, and total power requirement can be reduced at the same time.

---

This invention relates to a method and apparatus for fermenting the aerobic microorganisms under aerobic conditions efficiently in an industrial scale.

When the aerobic microorganisms, which will be hereinafter referred to merely as "microorganisms," are fermented under aerobic conditions in an industrial scale, it is necessary to supply oxygen to the microorganisms properly and remove the heat of fermentation generated from the microorganisms during the fermentation satisfactorily to keep the fermentation efficiency constant. When microorganisms are fermented in a fermentor tank in an industrial scale, the supply of oxygen to the culture medium is carried out by introducing pure air free from any microorganisms into the culture medium and dissolving the oxygen into the culture medium. Therefore, it has been so far necessary to introduce the air in a finely divided state into the culture medium and at the same time stir the culture medium sufficiently and mix the culture medium with the air completely to dissolve the air into the culture medium. Particularly, when hydrocarbons are used as a carbon source, it has been necessary to use the oxygen in an amount twice as much as that of carbohydrates, and consequently a large amount of air must be supplied to the culture medium, and at the same time an intensive stirring must be carried out. The power required for that purpose has been remarkably large.

On the other hand, microorganisms generate a large amount of the heat of fermentation when fermented. However, the microorganisms have a temperature suitable for their specific fermentation and therefore it is necessary to keep the culture medium at a temperature suitable for the fermentation. When a large amount of microorganisms are fermented in an industrial scale, the temperature of the culture medium is liable to exceed the optimum temperature for the growth of the microorganisms owing to the heat of fermentation, and therefore excess heat must be removed by cooling. The cooling must be carried out generally by removing the heat at a rate of 3,900 to 7,800 kcal./kg. cell to keep the culture medium at a temperature of 30° to 37° C. Thus, in the conventional apparatus, a large amount of the cooling water is necessary. In other words, the territory, where it is difficult to obtain a large amount of the cooling water at a low temperature, has been regarded especially as an unsuitable location for the fermentation industry. That is, the percentage of the cooling water in a cost has been very large.

Furthermore, the problems are not only the requirement for large amounts of air and cooling water, but also the additional requirement for much power.

In the fermentation, the amount of oxygen required by the microorganisms is gradually changed in the course of fermentation. That is, the requirement for oxygen is small at the initial stage, but then reaches a maximum and again is decreased. Such tendency appears also in the change of the heat of fermentation, and both oxygen requirement and heat of fermentation undergo similar changes in parallel. Heretofore, the supply of oxygen and the removal of the heat of fermentation have been carried out by controlling the air and cooling water independently.

An object of the present invention is to provide a method and apparatus for carrying out aerobic fermentation. In the present invention, the following advantages can be obtained:

(1) The heat of fermentation can be removed without using cooling water.

(2) Oxygen can be uniformly supplied to the culture medium.

(3) The removal of the heat of fermentation and the supply of oxygen to the culture medium can be carried out in the same operation.

(4) The removal of the heat of fermentation and the supply of oxygen to the culture medium can be carried out efficiently, whereby the total power requirement can be made to a minimum.

(5) The supply of oxygen to the culture medium can be carried out by adjusting the amount of oxygen in accordance with the oxygen requirement.

The present invention has various other objects and advantages than those described above, but these will be clear in the explanation of the embodiments of the present invention, which follow.

The present method for aerobic fermentation is characterized by carrying out gas-liquid contact of a culture medium containing aerobic microorganisms dispersed in a droplet state or in a film state with pure air free from microorganisms in a gas-liquid contacting zone thereby to remove the heat of fermentation of the culture medium as a latent heat and sensible heat of water contained in the culture medium and discharge the heat together with the air to the outside of the gas-liquid contacting zone, and at the same time dissolve the oxygen into the culture medium.

Furthermore, the present apparatus for aerobic fermentation is characterized by a gas-liquid contacting part for carrying out a gas-liquid contact of a culture medium containing aerobic microorganisms dispersed in a droplet state or in a film state with pure air free from microorganisms thereby to remove the heat of fermentation from the culture medium and at the same time dissolve oxygen into the culture medium; an air inlet provided below the gas-liquid contacting part; a feed inlet for the culture medium and an air outlet, both being provided above the gas-liquid contacting part; a retainer tank for holding the culture medium, which is communicated with the gas-liquid contacting part; a reflux part for withdrawing the culture medium from the bottom of the gas-liquid contacting part and refluxing the liquor to the feed inlet. Further characteristics of the present invention will be clear in the explanations of embodiments of the present invention, which follow.

Now, the present invention will be explained in detail, referring to the accompanying drawings:

FIGS. 3 to 5 show another embodiment of gas-liquid contacting parts of the apparatus for aerobic fermentation of the present invention.

Figure 1:
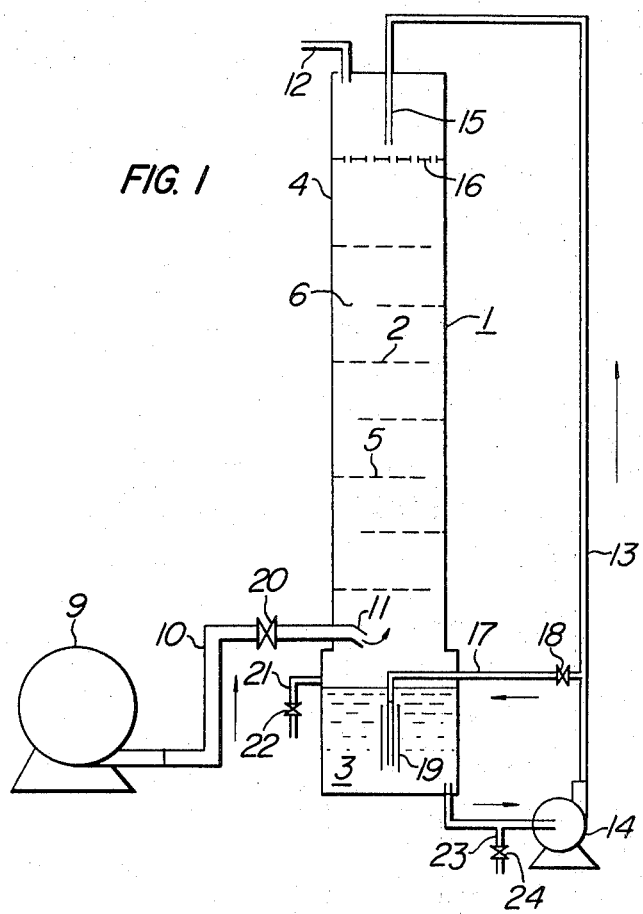
FIG. 1 shows an apparatus for aerobic fermentation of the present invention.
Figure 2A:
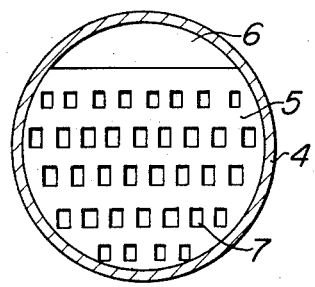
FIGS. 2a and 2b show details of column plate of the present invention.
Figure 2B:
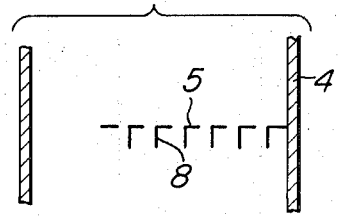

In FIG. 1, a basic embodiment of the present invention is illustrated. A fermentation tank 1 has a gas-liquid contacting part 2 as its upper part and a retainer tank 3 as its lower part. The gas-liquid contacting part 2 has a plurality of column plates 5 along the column wall 4, and predetermined clearances 6 are alternately arranged in a vertical direction between the column wall 4 and the column plates 5. Shape of the column plate is a partially cutaway circular disk, as shown in FIG. 2(a). The column plate 5 has a large number of openings 7 having small diameters, and a downwardly projected vertical plate 8 is fixed to each opening. That is, the column plate 5 is a lipped tray. The clearance 6 is provided for preventing a pressure increase within the column, and the use of the column plate 5 in the form of lipped tray is for improving the gas-liquid contact. At the bottom of the gas-liquid contacting part 2, a feed pipe 10 for transporting air from a blower 9 and an inlet 11 for introducing the air to the gas-liquid contacting part 2 are provided. The air fed to the gas-liquid contacting part 2 from the inlet 11 after microorganisms have been removed in a pretreating apparatus (not shown in the drawings) comes in contact with a culture medium within the column, and moves upwards through the column while removing the heat of fermentation as a latent heat and sensible heat of water contained in the culture medium and dissolving the oxygen into the culture medium at the same time, and is discharged from an outlet 12 at the top of the column. On the other hand, an end of a reflux pipe 13, whose other end is connected to the top of the gas-liquid contacting part 2, is provided at the bottom of the retainer tank 3, and the culture medium in the retainer tank 3 is fed to a liquid distributor plate 16 from the feed inlet 15 through a pump 14. The culture medium is made to liquid droplets by the column plates 5 and falls through the gas-liquid contacting part 2 filled with a large amount of air down to the retainer tank 3 at the bottom of the column, and is again refluxed to the top of the column through the pump 14. Since the microorganisms settle down or float up to form a layer when the culture medium is left standing in the retainer tank 3, a branched pipe 17 is provided on the midway of the reflux pipe 13 for feeding the culture medium to the top of the column through the pump 14 to prevent the formation of the layer of microorganisms, and one end of the branched pipe 17 is communicated with the bottom of a cylinder 19 provided at the center of the retainer tank 3, whereby a portion of the culture medium is returned to the retainer tank 3 to circulate the culture medium vertically within the retainer tank and prevent the formation of a layer of microorganisms. A valve 18 is to control a flow rate of the culture medium through the branched pipe 17, and a valve 20 is to control an amount of air from the blower 9. Both pipe 21 and valve 22 are to feed the culture medium before fermentation to the apparatus for aerobic fermentation. Both pipe 23 and valve 24 are to withdraw the culture medium after the fermentation.

The basic structure of the present apparatus for aerobic fermentation has been described above. As already mentioned above, an absolute amount of the heat of fermentation and oxygen requirement are changed with time in the fermentation, and they are smaller at the initial stage, but reach a maximum, and are again reduced. The absolute amount of the heat of fermentation and the oxygen requirement are changed in parallel. Thus, the air in an amount necessary for the removal of the heat of fermentation is introduced into the column through the blower 9. The culture medium undergoes gas-liquid contact with the air while the culture medium falls down from the top of the column to the bottom in a droplet state or in a film state, whereby the heat of fermentation is removed as a sensible heat and latent heat, and at the same time a large amount of oxygen is dissolved in the culture medium. By properly selecting an amount of the culture medium to be refluxed and an amount of the air to be introduced by the pump 14, the valve 20, etc., the supply of the required amount of oxygen and the removal of the heat of fermentation can be carried out only by air at the same time for the respective changes with time.

In FIGS. 3 to 5, another embodiments of the gas-liquid contacting parts of the present apparatus for aerobic fermentation are illustrated. In FIG. 3, an embodiment of a gas-liquid contacting part of a column based on a wetting wall type is shown. There are provided a large number of downwardly extended vertical plates 25 within the column. The gas-liquid contact is carried out while the culture medium flows down along the surfaces of the downwardly extended vertical plates 25. The wetting wall type column apparatus has a larger gas-liquid contacting area, and thus is very effective for the removal of heat. Particularly when the viscosity of the culture medium is low, the wetting wall column apparatus is very effective.

In FIG. 4, an embodiment of a gas-liquid contacting part of a packed column type apapratus is illustrated. There are provided a large number of packing materials 26 within the column. The culture medium is always in a droplet state by the packing materials 26, and thus a good gas-liquid contact can be attained. The removal of the heat of fermentation and the absorption of oxygen into the culture medium can be effectively carried out.

In FIG. 5, an embodiment of a gas-liquid contacting part of spray type apparatus is illustrated. The culture medium is sprayed down in a fine droplet state by a distributor plate 27 having very small openings provided at the upper part of the column. The spray type apparatus is very simple in the structure, but the gas-liquid contacting efficiency is low. Thus, it is suitable for culturing the microorganisms having less heat of fermentation and less oxygen requirement.

As is clear from the explanation of the basic embodiments of the present invention, the removal of the heat of fermentation can be carried out by air, chiefly by the latent heat, in the present apparatus for aerobic fermentation, and though the air in an amount about 10 times as much as that of the conventional art is necessary, no cooling water is required for the removal of the heat of fermentation in the present invention. In other words, various effects based on the elimination of the cooling water from the use are brought about in the present invention.

Figure 6:
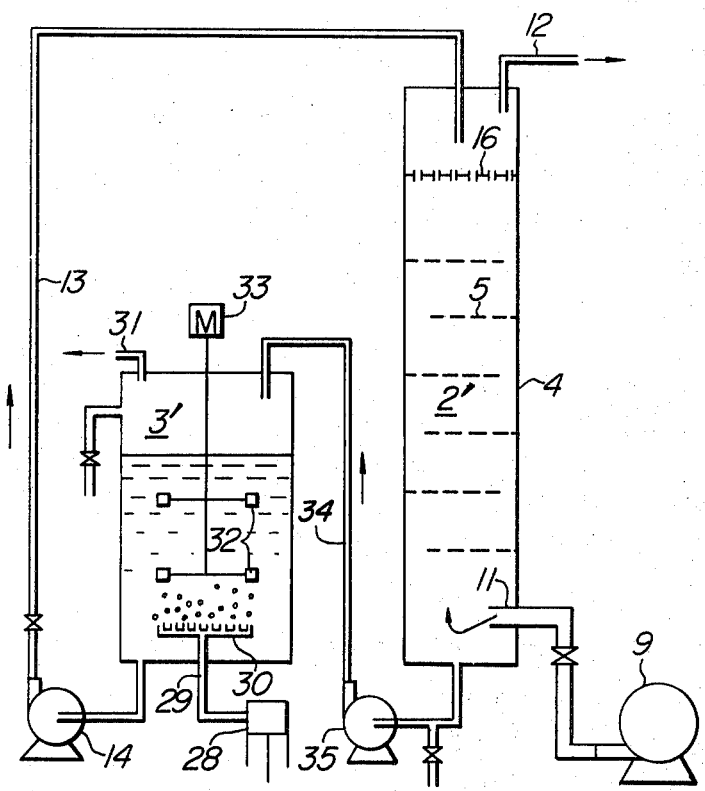
FIG. 6 shows another embodiment of the present invention, different from FIG. 1.

Now, the present invention will be explained, referring to FIG. 6 illustrating another embodiment. The embodiment is designed to make the amount of air necessary for supplying the oxygen required by the microorganisms coincide with the amount of air necessary for removing the heat of fermentation. These two air requirements are almost in a parallel relation, and the amount of air necessary for the oxygen required by the microorganisms is not so influenced by seasonal or daily temperature change, but the amount of air for removing the heat of fermentation is considerably influenced by the seasonal or daily temperature change. Furthermore, there is a slight difference between the amount of air for removing the heat of fermentation and that for the oxygen required by the microorganisms. In the embodiment, such situations are taken into consideration. In the embodiment illustrated in FIG. 6, the gas-liquid contacting part is separated from the retainer tank. In addition to those enumerated in the embodiment of FIG. 1, the following members are newly provided. In the retainer tank 3', an air-compressor 28 for supplying oxygen to the microorganisms in the retainer tank 3', an air feed pipe 29, an air inlet 30 of nozzle type, an air discharge pipe 31, a stirring impeller 32 for agitating the culture medium, and a motor 33 for the stirring impeller are provided. A reflux pipe 34 and reflux pump 35 are provided at the bottom of the gas-liquid contacting part 2′ to reflux the culture medium to the top of the retainer tank 3′.

The structure of another embodiment of the present invention has been described above. The first object of the liquid-gas contacting part 2′ is to remove the heat of fermentation, and the second object thereof is to carry out most of dissolution of the oxygen into the culture medium. The function and effect are the same as described above. The air feed inlet is provided at the retainer tank 3′ to make up the oxygen shortly dissolved in the culture medium in the gas-liquid contacting part 2 and control the amount of air necessary for removing the heat of fermentation and that necessary for oxygen required by the microorganisms.

In some kinds of microorganisms, the heat of fermentation is smaller, but a larger amount of oxygen is required. In such microorganisms, the amount of air for the oxygen required by the microorganisms is larger than the amount of air necessary for removing the heat of fermentation through the gas-liquid contact. To dissolve a sufficient amount of oxygen into the culture medium, additional air is necessary. However, when the air is supplied thereto in an amount which satisfies the amount of oxygen required by the microorganisms, the culture medium is supercooled and the culturing of the microorganisms is thereby impeded. In such a case, the air is supplied by the blower 9 in an amount necessary for the cooling, and the air, which is short and necessary for the culture medium as the oxygen source, is fed into the retainer tank 3′ by the air compressor 28. The amount of air supplied by the air compressor 28 for dissolving the oxygen into the culture medium is smaller than that from the blower 9, and thus the culture medium is never supercooled by the former air. Such procedure should be carried out when the air temperature is considerably lowered in winter season. According to the embodiment, the additional oxygen (air) is supplied even in the retainer tank, and thus the microorganisms will not be perished owing to the shortage in the oxygen in the retainer tank, even if the culture medium is retained in the retainer tank for a long ime. Furthermore, the apparatus can be readily installed owing to the separation of the gas-liquid contacting part and the retainer tank.

Figure 7:
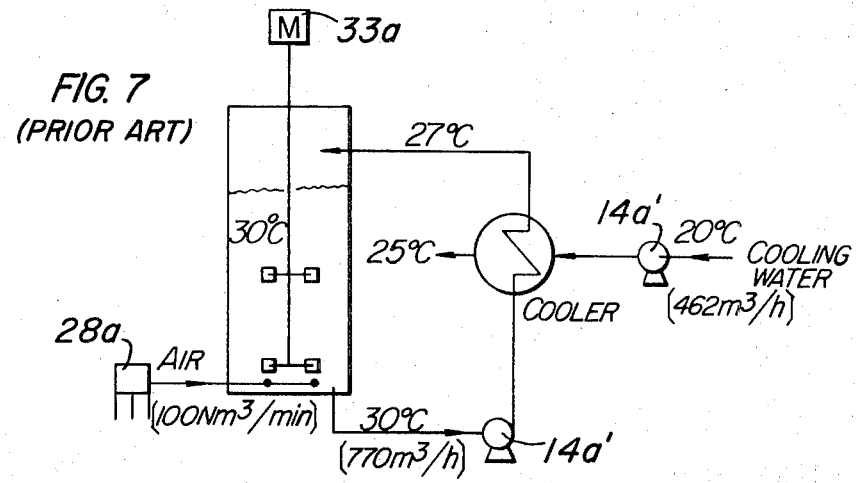
FIGS. 7 to 9 show comparisons in power between the conventional art and the present invention.
Figure 8:
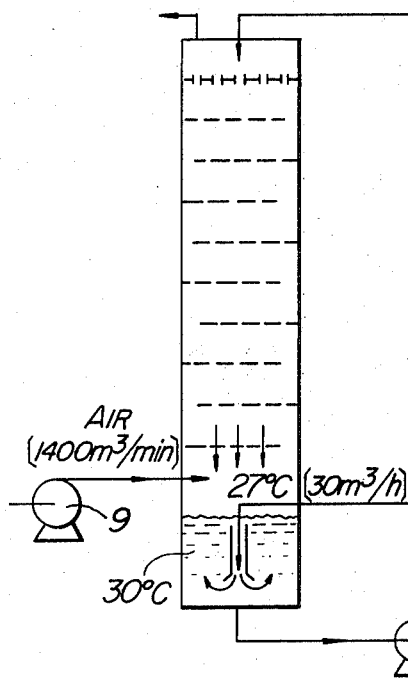
Figure 9:
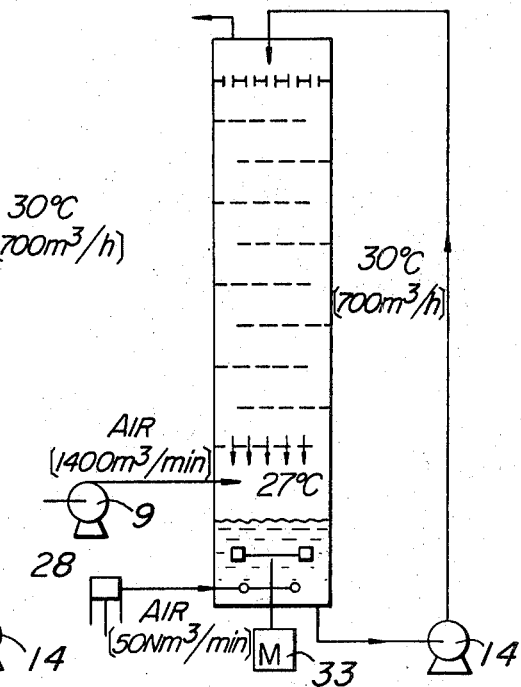

According to the present invention, no cooling water is required at all, as described above, and the power can be greatly reduced. In FIGS. 7 to 9, comparison of power is made between the conventional art and the present invention. In FIG. 7, the conventional apparatus of outside cooling type is illustrated. In FIG. 8, the embodiment of the present invention of FIG. 1 is illustrated. In FIG. 9, another embodiment of the present invention, where the embodiment of FIG. 6 is integrated into one column, is illustrated. The operating conditions of the respective examples are shown in the respective drawings, and the power requirements are shown in the following table.

TABLE

[Comparison of power in Figs. 7 to 9]

| | Unit: kw. | | |
|---|---|---|---|
| | Fig. 7 | Fig. 8 | Fig. 9 |
| Compressor (28, 28a) | 600 | | 400 |
| Blower 9 | | 175 | 175 |
| Pump (14, 14a) | 110 | 80 | 55 |
| Pump (14a′) | 80 | | |
| Motor (33, 33a) | 400 | | 300 |
| Total | 1,190 | 235 | 930 |

As is clear from FIGS. 7 to 9 and Table, the operation can be carried out in the present invention with less power, and thus the culturing of the microorganisms can be carried out effectively at a low cost.

Further, no cooling water is required in the present invention, and a procurement of industrial water is not an essential condition for selecting a plant location. Rather, the available area for selecting the industrial plant location is made broader. Considerable reduction in power assures a low cost fermentation.

The present invention can be carried out not only in batch-wise fermentation, but also in continuous fermentation.

What is claimed is:

1. An apparatus for aerobic fermentation comprising a retainer tank for holding a liquid culture medium containing aerobic microorganisms, means forming a gas-liquid contacting zone, means for withdrawing a portion of the culture medium from said retainer tank and for supplying said portion of said culture medium to said gas-liquid contacting zone, means for dispersing said portion of culture medium in a droplet state or in a film state through said gas-liquid contacting zone, air inlet means for introducing air into said gas-liquid contacting zone to dissolve oxygen into the culture medium within said gas-liquid contacting zone in an amount sufficient to ferment said microorganisms and simultaneously to remove the heat of fermentation from the culture medium in said gas-liquid contacting zone, means for regulating the flow rate of the air introduced into said gas-liquid contacting zone with respect to that portion of the culture medium supplied to said gas-liquid contacting zone to keep said culture medium at a temperature suitable for fermentation and means for discharging the heated air containing heat of fermentation from said gas-liquid contacting zone; said means for forming said gas-liquid contacting zone including means for providing contact between said air and said dispersed culture medium and for preventing a substantial increase in the pressure of air within said gas-liquid contacting zone.

2. An apparatus according to claim 1, wherein said means for providing contact between said air and said dispersed culture medium comprises a plurality of downwardly extended vertical plates positioned within said gas-liquid zone.

3. An apparatus according to claim 1, wherein said means forming the gas-liquid contacting zone is a closed vertical column having a liquid inlet for the culture medium from said retainer tank, a liquid outlet for discharging the culture medium from the bottom of said column into said retainer tank and said means for providing the contact between said air and said dispersed culture medium comprises a plurality of vertically spaced plates each of said plates having a clearance between a wall of said vertical column sufficient to prevent substantial pressure increase of the air flowing through said column, said plurality of plates being so arranged that at least a portion of the air introduced by said air inlet means flows through said clearances into said means for discharging the heated air from said gas-liquid contacting zone.

4. An apparatus according to claim 1, wherein said means for dispersing said culture medium into a droplet state or a film state is disposed at the upper portion of said gas-liquid contacting zone and said air inlet means is disposed at the bottom of said gas-liquid contacting zone.

5. An apparatus according to claim 1, wherein the retainer tank is provided below the gas-liquid contacting zone, whereby the gas-liquid contacting zone and the retainer tank are integrated together.

6. An apparatus according to claim 1, wherein the gas-liquid contacting zone and the retainer tank are provided separately.

7. An apparatus according to claim 1, wherein an additional air inlet means is provided in said retainer tank to introduce additional air into the culture medium contained therein, whereby any shortage of dissolved oxygen within said culture medium is made up.

8. An apparatus according to claim 1, wherein a stirrer is provided at the retainer tank to prevent settling of aerobic microorganisms by stirring the culture medium.

9. An apparatus according to claim 1, wherein a portion of the culture medium withdrawn is returned to the retainer tank to stir the culture medium retained in the retainer tank and to prevent settling of the aerobic microorganisms in the retainer tank.

10. An apparatus according to claim 1, wherein an additional air inlet means for making up oxygen shortly dissolved in the culture medium in the gas-liquid contacting zone and a stirrer for preventing the settling of aerobic mircoorganisms are provided at the retainer tank.

11. An apparatus according to claim 1, wherein a wetting wall type column is used as the gas-liquid contacting zone.

12. An apparatus according to claim 1, wherein a spray type contactor is used as the gas-liquid contacting zone.

13. An apparatus according to claim 1, wherein plate trays are provided within the gas-liquid contacting zone.

14. An apparatus according to claim 13, wherein a lipped tray is used for each of the plate trays.

References Cited
UNITED STATES PATENTS

| | | | |
|---|---|---|---|
| 2,146,326 | 2/1939 | Bergius et al. | 195—142 |
| 3,645,846 | 2/1972 | Imada et al. | 195—142 |
| 3,476,366 | 11/1969 | Brooks et al. | 195—142 |

A. LOUIS MONACELL, Primary Examiner

R. J. WARDEN, Assistant Examiner

U.S. Cl. X.R.

195—109